United States Patent [19]
Mizuno et al.

[11] Patent Number: 5,688,294
[45] Date of Patent: Nov. 18, 1997

[54] METHOD FOR MANUFACTURING A CYLINDRICAL NICKEL-HYDROGEN RECHARGEABLE BATTERY

[75] Inventors: Takashi Mizuno; Yukinari Kondo; Masanori Suzuki, all of Iwaki, Japan

[73] Assignee: Furukawa Denchi Kabushiki Kaisha, Yokohama, Japan

[21] Appl. No.: 740,854

[22] Filed: Nov. 4, 1996

[30]  Foreign Application Priority Data

Nov. 10, 1995 [JP] Japan .................................. 7-293032

[51] Int. Cl.$^6$ ............................................... H01M 10/38
[52] U.S. Cl. ........................... 29/623.2; 429/54; 429/174
[58] Field of Search ............................... 29/623.2, 623.1; 429/171–174, 53, 54

[56]  References Cited

U.S. PATENT DOCUMENTS

| | | | |
|---|---|---|---|
| 3,068,313 | 12/1962 | Daley et al. | |
| 3,939,011 | 2/1976 | Zaleski | 429/54 |
| 4,207,385 | 6/1980 | Hayama | |
| 4,298,662 | 11/1981 | Sugalski et al. | 429/54 |
| 4,740,435 | 4/1988 | Markin et al. | |
| 5,080,984 | 1/1992 | Thibault et al. | 429/174 |
| 5,150,602 | 9/1992 | Payne et al. | 29/623.2 |
| 5,478,669 | 12/1995 | Flack | 429/174 |

FOREIGN PATENT DOCUMENTS 1 099 018  11/1959  Germany .

OTHER PUBLICATIONS

Patent Abstracts of Japan, vol. 010, No. 170 (1986) of JP 61 022565A (No Month).
Derwent Publications Ltd., AN 80–10066C (1979) of JP 54 162 138 A (No Month).

Primary Examiner—Anthony Skapars
Attorney, Agent, or Firm—Frishauf, Holtz, Goodman, Langer & Chick, P.C.

[57]  ABSTRACT

A stepped insulating ring having a large-diameter upper portion, a small-diameter foot portion, and a step portion formed on the inside is inserted from a top opening of a bottomed cylindrical can containing a plate group and electrolyte and the small-diameter foot portion is set onto the plate group, a peripheral portion of a cover in which a safety valve is incorporated is set onto the step portion of the stepped insulating ring, and the areas to be sealed where an inside wall of top opening of the bottomed cylindrical can faces an outside wall of the large-diameter upper portion of the stepped insulating ring and an inside wall of the large-diameter upper portion faces a peripheral portion of the cover is formed, and when crimping operation on said areas to be sealed is performed from the outside of the upper part of the bottomed cylindrical can to form a closed construction, a sealing compound consisting of oily bitumen, organic solvent, and paraffin base oil is applied to the areas where an inside wall of top opening of the bottomed cylindrical can faces an outside wall of the large-diameter upper portion of the stepped insulating ring and an inside wall of the large-diameter upper portion faces a peripheral portion of the cover before the areas to be sealed are formed, and drying operation of the sealing compound is performed. On the battery obtained, the leakage of electrolyte scarcely occurs even in a high-temperature, high-humidity environment.

4 Claims, 7 Drawing Sheets

METHOD FOR MANUFACTURING A CYLINDRICAL NICKEL-HYDROGEN RECHARGEABLE BATTERY

BACKGROUND OF THE INVENTION

1. Field of the Invention

The present invention relates to a method for manufacturing a cylindrical nickel-hydrogen rechargeable battery and, more particularly, to a method for manufacturing a cylindrical nickel-hydrogen rechargeable battery in which electrolyte leakage scarcely occurs even in a high-temperature, high-humidity environment.

2. Prior Art

A nickel-hydrogen rechargeable battery is a battery which operates using hydrogen as an active material. It is constructed so that a power generating element is formed by interposing a separator, having electrical insulating properties and liquid holding properties, between a Ni electrode (positive electrode) consisting of a collector carrying $Ni(OH)_2$, which is a positive electrode active material, and a hydrogen storage alloy electrode (negative electrode) consisting of a collector carrying a hydrogen storage alloy, which can reversibly perform electrochemical absorption and release of hydrogen, the power generating element is contained in a conductive bottomed can, which is also used as a negative electrode terminal, and the top of the can is closed by a cover, which is also used as a positive electrode terminal, after a predetermined alkali electrolyte is poured in the can.

The nickel-hydrogen second batteries are broadly classified into square-shaped batteries and cylindrical batteries according to the entire shape.

Among these, the cylindrical battery is generally manufactured in the following manner. The manufacturing method is explained with reference to the drawings.

Figure 1:
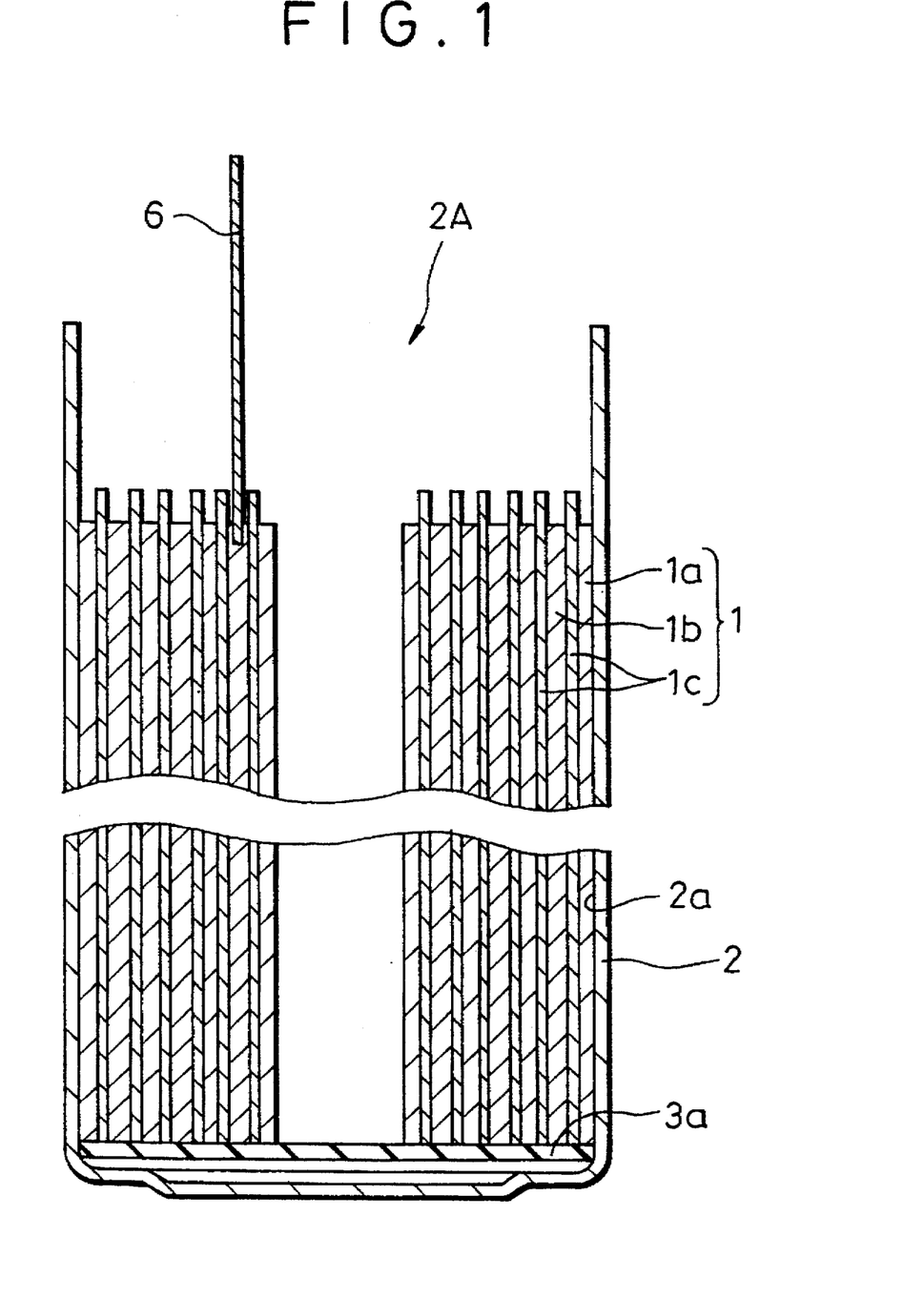
FIG. 1 is an enlarged sectional view showing a state in which a plate group member is arranged in a bottomed cylindrical can.

First, as shown in FIG. 1, a Ni electrode sheet 1b and hydrogen storage alloy electrode a sheet 1a are manufactured by the ordinary method, a separator sheet 1c is interposed between these sheets, and the whole is wound with the hydrogen storage alloy electrode sheet being placed outside to manufacture a plate group member 1 having a predetermined outside diameter and height.

Then, an insulating plate 3a is laid at the bottom of a conductive bottomed cylindrical can 2 having a predetermined height and inside diameter, and the aforementioned plate group member 1 is inserted from a top opening 2A of the bottomed cylindrical can 2 so that the lower end of the plate group member 1 seats on the insulating plate 3a. At this time, the outside diameter of the plate group member 1 is approximately equal to the inside diameter of the bottomed cylindrical can 2, so that after the plate group member 1 is inserted, the hydrogen storage alloy electrode sheet 1a positioned on the outermost side of the plate group member 1 is in surface contact with the inside wall 2a of the bottomed cylindrical can 2 in such a manner as to adhere to the inside wall 2a, by which the bottomed cylindrical can 2 can function as a negative electrode terminal as a whole.

On top of the Ni electrode sheet 1b of the plate group member 1, a current collecting tab (not shown) is installed by, for example, spot welding.

After the plate group member 1 is inserted and seated in the can, a predetermined amount of a predetermined alkali electrolyte is usually poured from the top opening 2A. The poured alkali electrolyte permeates in the whole of the plate group member 1, by which a state in which battery reaction in the plate group member 1 can take place is accomplished.

Figure 2:
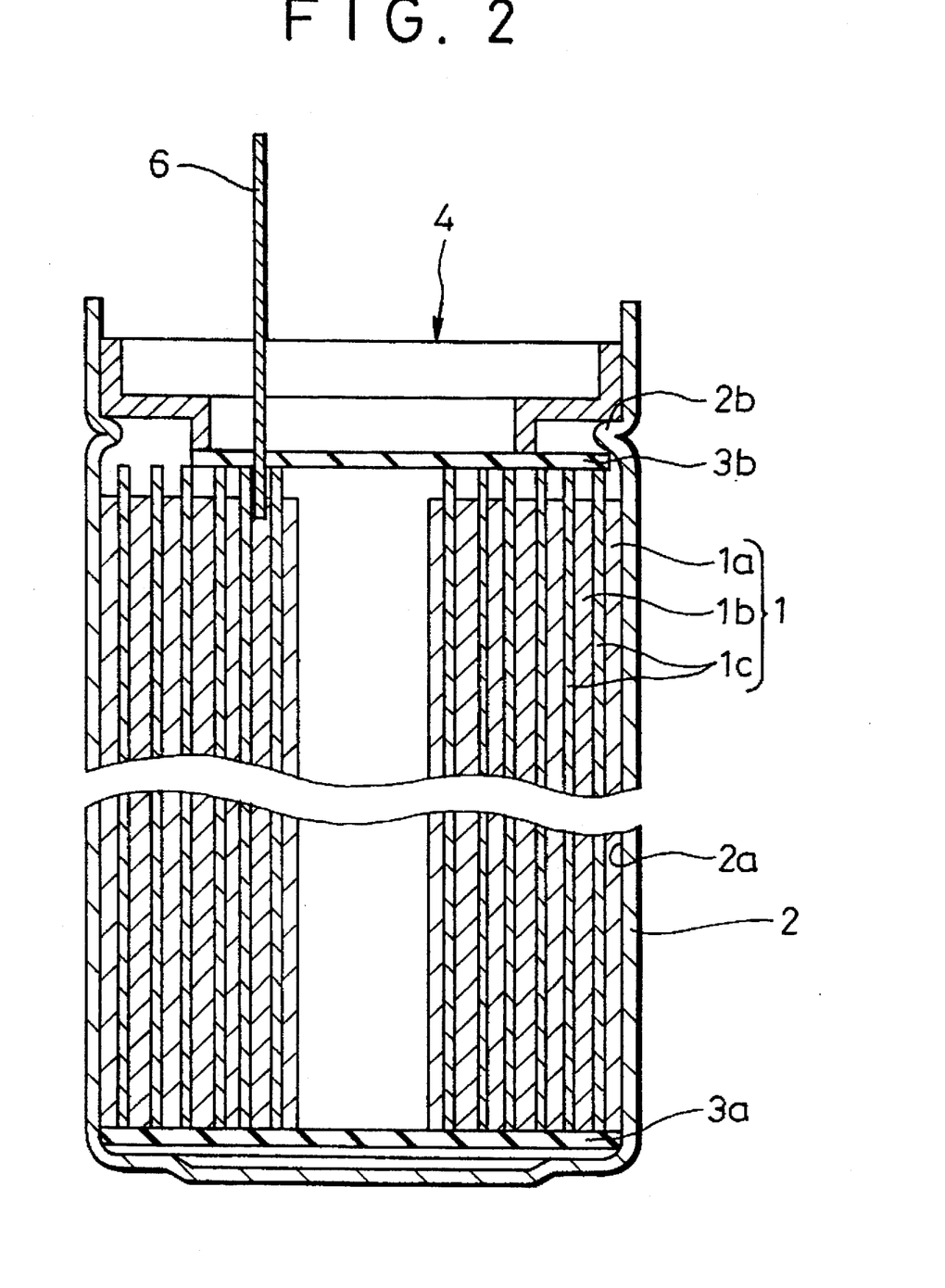
FIG. 2 is an enlarged sectional view showing a state in which a stepped insulating ring onto a shelf portion of the bottomed cylindrical can.

Usually, after a thin insulating plate 3b is laid on top of the plate group member 1, a shelf portion 2b is formed by slightly corrugating the can wall above the insulating plate 3b to the inside, and then a stepped insulating ring 4 is disposed on the shelf portion 2b as shown in FIG. 2.

Figure 3:
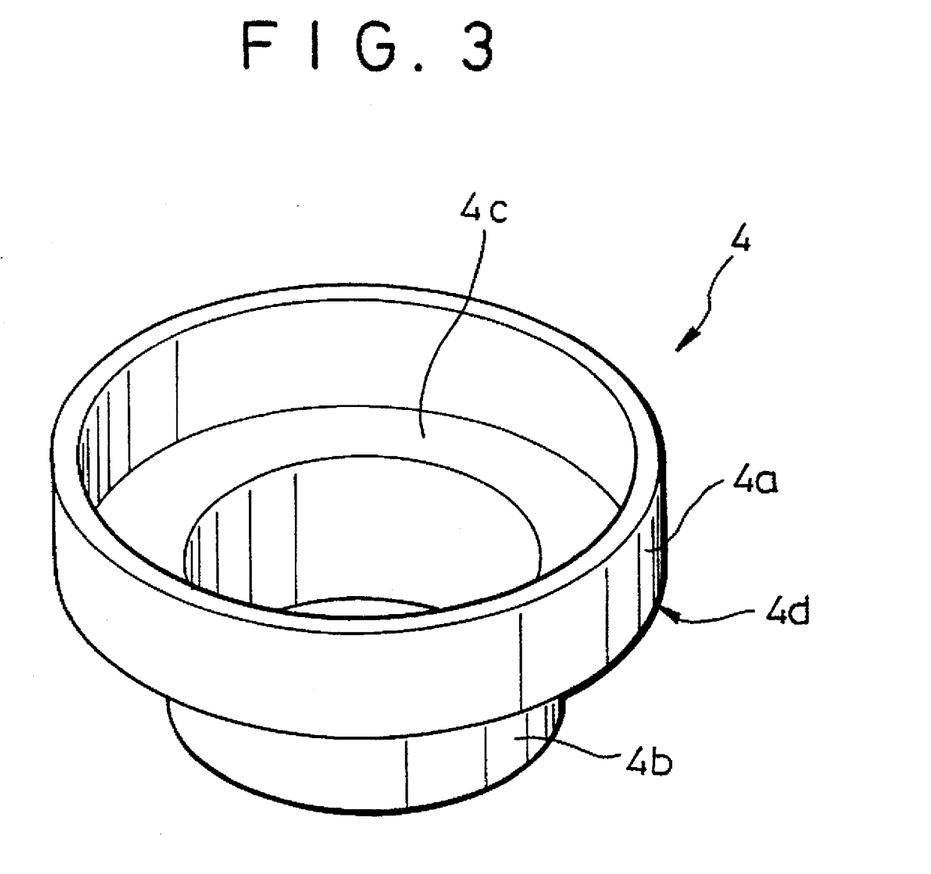
FIG. 3 is a perspective view of the stepped insulating ring.

This stepped insulating ring 4 is made of an electrical insulating resin such as nylon and polypropylene, and as shown in FIG. 3, the upper part thereof consists of a large-diameter upper portion 4a whose outside diameter is approximately equal to the inside diameter of the bottomed cylindrical can 2, and the lower part consists of a small-diameter foot portion 4b which has a diameter smaller than that of the upper portion and an appropriate height. Therefore, at the periphery of the ring inside, a step portion 4c extending toward the center is formed, and the boundary between the large-diameter upper portion 4a and the small-diameter foot portion 4b is formed as a corner 4d.

Figure 4:
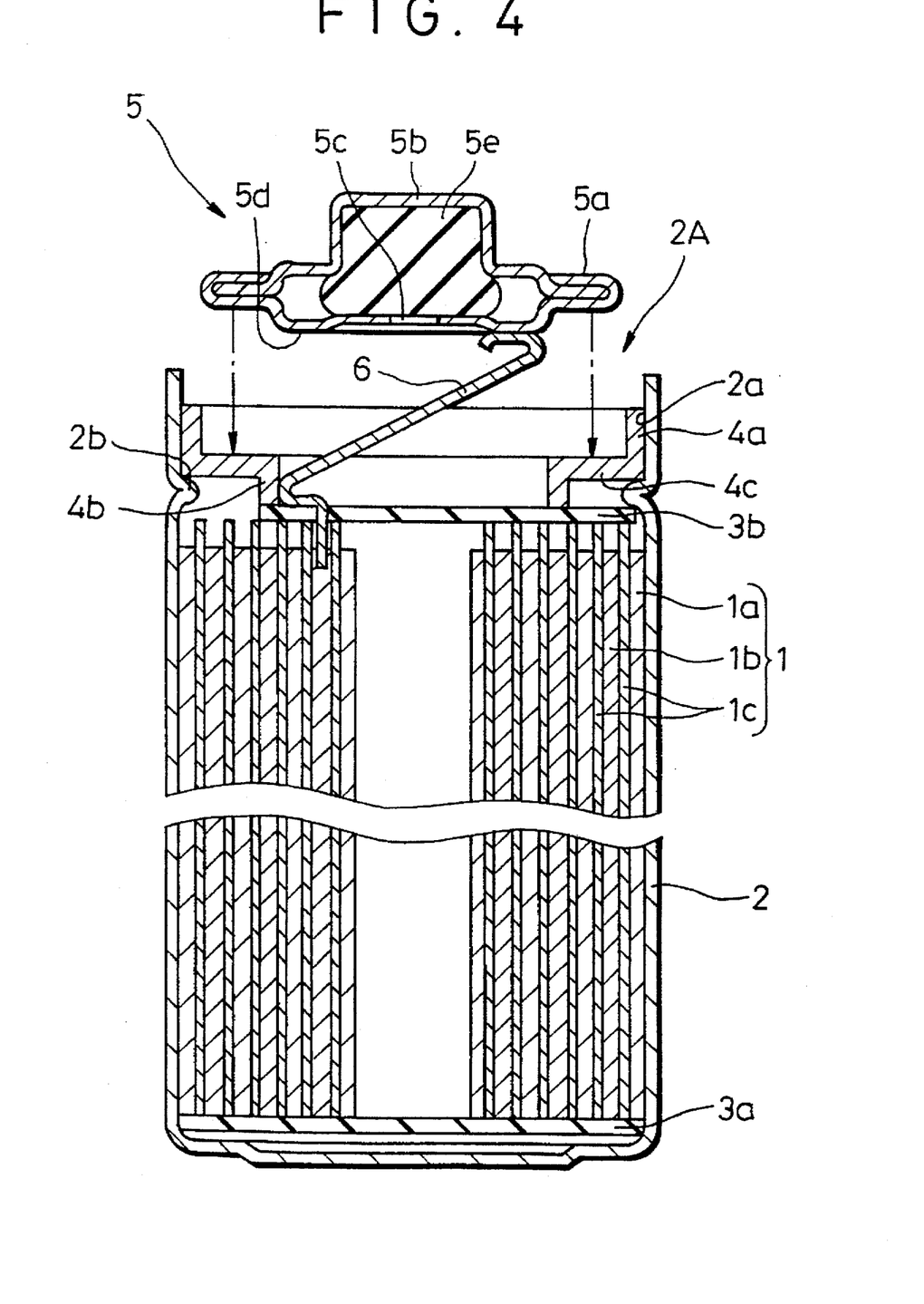
FIG. 4 is an enlarged sectional view showing a state in which a cover is set onto the stepped insulating ring.

Next, as shown in FIG. 4, a peripheral portion 5a of a cover 5, which has been assembled in advance in a separate process, is set to the step portion 4c of the stepped insulating ring 4.

This cover 5 is so constructed that a safety valve 5e made of, for example, an elastic rubber material is held between a thin conductive plate 5b and a thin conductive plate 5d having a small hole 5c formed at the center, and a peripheral portion 5a of an airtight construction is formed by crimping the peripheries of the conductive plates 5a and 5b.

Since the cover 5 is also used as a positive electrode terminal of the battery, before the cover 5 is set to the step portion 4c of the stepped insulating ring 4, the end of a current collecting sheet 6 connected to each tab terminal installed to the Ni electrode 1b of the plate group member 1 is joined collectively to the conductive plate 5d by, for example, spot welding. This current collecting sheet 6 is bent by the arrangement of the cover 5, and contained in an inside space in the stepped insulating ring 4.

By setting the peripheral portion 5a of the cover 5 on the step portion 4c of the stepped insulating ring 4, at the upper part of the bottomed cylindrical can 2, the inside wall 2a of the top opening of the bottomed cylindrical can 2 faces an outside peripheral wall 4A of the large-diameter upper portion 4a of the stepped insulating ring 4, and an inside peripheral wall 4B including the step portion 4c of the stepped insulating ring 4 faces the peripheral portion 5a of the cover 5, by which an area to be sealed is formed as a whole.

Finally, a predetermined crimping operation is performed from the outside of the aforementioned area to be sealed.

Figure 5:
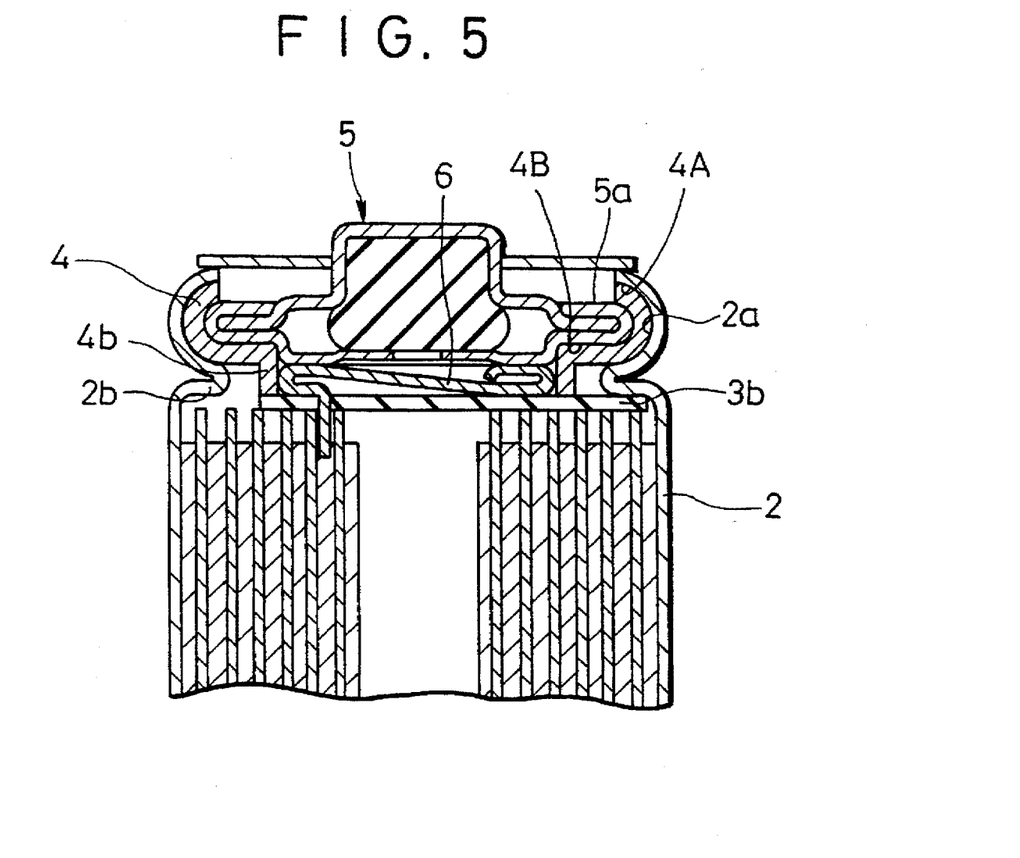
FIG. 5 is an enlarged sectional view showing a state of a crimped seal area after crimping is finished.

As a result, as shown in FIG. 5, the stepped insulating ring 4 made of a resin is deformed by the crimping force. Near the top opening of the bottomed cylindrical can 2, the inside wall 2a and the shelf portion 2b of the bottomed cylindrical can 2 adheres to the outside peripheral wall 4A of the large-diameter upper portion 4a of the stepped insulating ring 4, forming a liquid-tight construction, and on the inside of the large-diameter upper portion 4a, the inside peripheral wall 4B including the step portion 4c adheres to the peripheral portion 5a of the cover 5, forming a liquid-tight construction, by which a crimped seal area is formed, so that the battery is closed as a whole.

For the cylindrical nickel-hydrogen rechargeable battery assembled as described above, since the surface tension of the poured alkali electrolyte is very low, the alkali electrolyte exhibits a behavior of climbing up on the inside wall 2a along minute flaws and wrinkles present on the inside wall 2a of the bottomed cylindrical can 2.

The alkali electrolyte reaches the aforementioned crimped seal area, and at the crimped seal area shown in FIG. 5, it sometimes leaks to the outside by passing through the adhesion surface between the inside wall 2a of the bottomed cylindrical can 2 and the outside peripheral wall 4A of the large-diameter upper portion 4a of the stepped insulating ring 4.

Also, in FIG. 5, the alkali electrolyte coming along the insulating plate 3b sometimes leaks to the outside by climbing up on the aforementioned outside peripheral wall 4A from the small-diameter foot portion 4b of the stepped insulating ring 4, and leaks to the outside by passing through the adhesion surface between the inside peripheral wall 4B of the stepped insulating ring 4 and the peripheral portion 5a of the cover 5.

Such a leakage phenomenon takes place remarkably when the battery is stored or used in a high-temperature, high-humidity environment. Also, it occurs frequently when the discharge capacity of the battery decreases.

To prevent this leakage phenomenon, various measures are taken. For example, the inside wall of the bottomed cylindrical can used is made smooth to the utmost, or the tolerance in crimping is controlled strictly. Further, a sealing compound such as uncured epoxy resin is applied to the stepped insulating ring to stop the leakage of the alkali electrolyte.

However, in the case of the former measures, the manufacturing cost of the bottomed cylindrical can increases, and the setting of the crimping conditions becomes complicated, resulting in the increase in cost. Moreover, the leakage of the alkali electrolyte cannot be prevented completely.

In the case of the latter measures, although the actual use of various types of sealing compounds has been tried, a sealing compound capable of reliably preventing the leakage of the alkali electrolyte even in a high-temperature, high-humidity environment has not been developed until now.

OBJECTS AND SUMMARY OF THE INVENTION

An object of the present invention is to solve the above problems with the conventional cylindrical nickel-hydrogen rechargeable battery by providing a method for manufacturing a nickel-hydrogen cylindrical rechargeable battery on which the leakage of electrolyte does not occur by using a sealing compound, described later.

To achieve the above object, the present invention provides a method for manufacturing a nickel-hydrogen cylindrical rechargeable battery, comprising the steps of:

inserting a stepped insulating ring having a large-diameter upper portion, a small-diameter foot portion, and a step portion formed on the inside from a top opening of a bottomed cylindrical can containing a plate group member and electrolyte and setting the small-diameter foot portion onto the plate group member;

setting a peripheral portion of a cover in which a safety valve is incorporated onto the step portion of the stepped insulating ring, and forming areas to be sealed where an inside wall of top opening of the bottomed cylindrical can faces an outside wall of the large-diameter upper portion of the stepped insulating ring and an inside wall of the large-diameter upper portion faces a peripheral portion of the cover; and performing crimping operation on the areas to be sealed from the outside of the upper part of the bottomed cylindrical can;

and further comprising the step of applying a sealing compound consisting of oily bitumen, organic solvent, and paraffin base oil to the areas where the inside wall of top opening of the bottomed cylindrical can faces the outside wall of the large-diameter upper portion of the stepped insulating ring and the inside wall of the large-diameter upper portion faces the peripheral portion of the cover before the areas to be sealed are formed, and performing drying operation of the sealing compound.

DETAILED DESCRIPTION OF THE INVENTION

In the present invention, when the aforementioned area to be sealed is formed, a fixed amount of a sealing compound, described later, is applied to the area where the top opening inside wall 2a and the shelf portion 2b of the bottomed cylindrical can 2 faces the outside peripheral wall 4A of the large-diameter upper portion 4a of the stepped insulating ring 4, and to the area where the inside peripheral wall 4B of the large-diameter upper portion 4a faces the peripheral portion 5a of the cover 5, and further drying operation is performed.

Specifically, the sealing compound is applied to the stepped insulating ring 4 shown in FIG. 3 in such a manner as is described later, and after drying, the stepped insulating ring 4 is placed on the plate group member 1, by which the areas to be sealed are formed.

The sealing compound used in the present invention employs oily bitumen, organic solvent, and paraffin base oil as essential ingredients, and is prepared by mixing them.

In mixing, both of oily bitumen and paraffin base oil are dissolved in organic solvent, so that the prepared sealing compound becomes in a viscous applicable liquid state.

When being in this applicable liquid state, the sealing compound is applied to the stepped insulating ring, for example, and then drying operation is performed.

Therefore, after the drying operation is finished, the organic solvent of the three ingredients of the applied sealing compound vaporizes, and a coating film in a state in which oily bitumen and paraffin base oil mainly remain is formed at the application area.

That is to say, when crimping is performed, the sealing compound having been applied to the areas to be sealed turns to a coating film, which has a composition such that oily bitumen and paraffin base oil are principal ingredients.

Of the three ingredients, oily bitumen, having water repellency and alkali resistance, composes the principal ingredient of sealing compound. After crimping, it achieves a sealing effect without being attacked even if it comes in contact with the climbing electrolyte.

As the oily bitumen, for example, asphalts such as natural asphalt, blown asphalt, cut-back asphalt, and petroleum asphalt specified in JIS K2207; pitches such as coal tar pitch, wood tar pitch, rosin pitch, and various pitches specified in JIS K2471; and tars such as coal tar, shale tar, wood tar, oil gas tar, and petroleum tar can be used.

Of these, asphalts achieve a great sealing effect, and are suitable for easily preparing sealing compound.

Concretely, Asphalt Primer R (trade name, manufactured by Sankyo Yuka Kougyo), SK Super Asphalt 7-8, SK Super Asphalt 3-E, SK Super Asphalt 10-20 (trade names) etc. can be enumerated.

The organic solvent is an ingredient mixed for dissolving the aforementioned oily bitumen. Any type of solvent which can dissolve the oily bitumen used can be employed, so that a proper solvent, such as toluene, xylene, and benzene is selected by the relationship with the oily bitumen used.

The paraffin base oil is mixed as an ingredient for keeping the sealing properties in crimping by giving a proper viscoelasticity to the oily bitumen, the principal ingredient, even if organic solvent has vaporized from the sealing compound when the crimping operation is performed.

As the paraffin base oil, any type of distillate obtained by vacuum distilling pressed distillate after the waxy distillate component of paraffin base crude oil is dewaxed by, for example, the filter press dewaxing process can be used. Concretely, for example, FBK#150 (trade name, manufactured by Nippon Sekiyu), Sanlub B-150 (trade name, manufactured by Sankyo Yuka Kougyo), and FBKR046 and FBKR0220 (trade names, manufactured by Nippon Sekiyu) can be enumerated.

This sealing compound is preferably prepared by fixing 10 to 200 parts by weight of organic solvent and 1 to 10 parts by weight of paraffin base oil with 100 parts by weight of oily bitumen.

If the mixing amount of organic solvent is larger than 200 parts by weight, the sealing compound is easy to flow, so that it is sometimes difficult to form a good coating film because the sealing compound flows out, for example, when being applied to the stepped insulating ring, and also the relative ratio of oily bitumen which achieves a good sealing effect decreases, so that there appears a tendency for a sufficient sealing effect not to be achieved. If the amount of organic solvent is smaller than 10 parts by weight, the flowability of sealing compound deteriorates, making the application work difficult.

If the mixing amount of paraffin base oil is larger than 10 parts by weight the coating film of sealing compound is too soft even after the drying process is finished, so that the sealing compound is pushed out of the crimped seal areas to the outside during the crimping operation, resulting sometimes in poor appearance of the battery. Inversely, if the amount of paraffin base oil is smaller than 1 part by weight, the coating film (oily bitumen) of sealing compound is hard after the drying process is finished, so that the coating film is broken and many minute cracks develop in the coating film positioned at the crimped seal areas. As a result, the sealing effect is decreased.

The sealing compound thus prepared is applied to the areas to be sealed, specifically, to the inside wall of top opening of the bottomed cylindrical can or to the area where the shelf portion and the stepped insulating ring face the peripheral portion of the cover.

From the viewpoint of the flow of the total battery production line, it is preferable to apply the sealing compound to the stepped insulating ring. This is because the area to be sealed which has a great sealing effect can be formed by performing drying operation after application and merely by setting the stepped insulating ring as it is onto the plate group member which is already contained in the bottomed cylindrical can and in a standby state.

Figure 6:
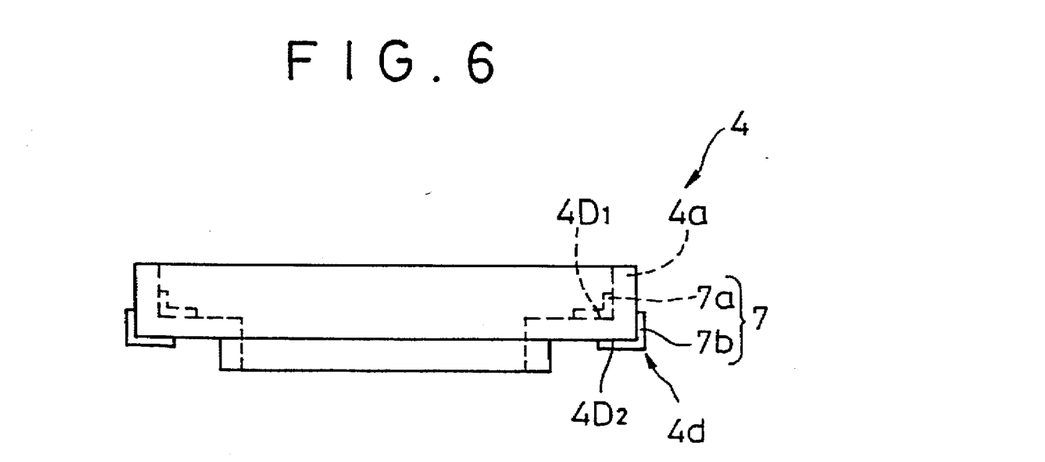
FIG. 6 is a side view showing a state in which a sealing compound is applied to the stepped insulating ring.

When the sealing compound is applied to the stepped insulating ring, it is not necessarily needed to apply the sealing compound to the whole of the ring. For example, as shown in FIG. 6, it is preferable that the sealing compound $7a, 7b$ is applied to only an inside portion $4D_1$ and an outside portion $4D_2$ of the corner $4d$ of the total surface of the large-diameter upper portion $4a$ of the stepped insulating ring 4 over the whole circumference.

Alternatively, the sealing compound may be applied to the shelf portion $2b$ of the bottomed cylindrical can 2 shown in FIG. 2 without being applied to the outside portion $4D_2$ of the stepped insulating ring 4.

The whole surface of the stepped insulating ring 4 may be coated with the sealing compound by dipping the whole of the ring 4 in the applicable liquid of sealing compound and then taking it out. In this case, the whole surface of the stepped insulating ring 4 is sticky, so that, for example, when the stepped insulating ring is carried to the next process while being held, it sticks to a holding device etc., making the handling thereof difficult.

However, as described above, if the sealing compound is applied partially to only the inside portion $4D_1$ and the outside portion $4D_2$ of the corner $4d$ or the shelf portion $2b$ of the bottomed cylindrical can 2, the stepped insulating ring 4 can be carried to the next process while the portion to which the sealing compound is not applied is held, resulting in no trouble.

The application as shown in FIG. 6 may be performed by a manual operation such as brush application or by a mechanical means such that a predetermined amount of sealing compound is applied while spraying from a nozzle, for example.

The thickness of the applied sealing compound is selected appropriately by a clearance between the inside wall $2a$ of the bottomed cylindrical can 2 and the outside peripheral wall $4A$ of the large-diameter upper portion $4a$ of the stepped insulating ring 4, a clearance between the inside peripheral surface $4B$ of the large-diameter upper portion $4a$ and the peripheral portion $5a$ of the cover 5, and the crimping conditions in crimping. Generally, if the formed coating film is too thin, the sealing effect after crimping is decreased.

For this reason, in the present invention it is preferable to adjust the thickness of the coating film (the coating film such that organic solvent vaporizes, and oily bitumen and paraffin base oil are present as principal ingredients) formed by performing drying a operation after the application of sealing compound, as described below.

When the sealing compound of the aforementioned composition is used it is preferable that the weight (g) of formed coating film per coating area (cm$^2$) be larger than 0.001 g/cm$^2$. When the sealing compound is applied, the coating amount of the sealing compound is adjusted so that such a coating film is formed.

However, if the thickness of coating film is too great, when the crimping operation is performed, the coating film is pushed out from the crimped seal areas to the outside, resulting in poor appearance. Therefore, it is preferable that the upper limit of the thickness of formed coating film be set at a value not higher than 0.005 g/cm$^2$ expressed by the above-described coating amount.

Next, as shown in FIG. 6, after the sealing compound 7 is applied to, for example, the corner 4d of the stepped insulating ring 4, a drying operation is performed to vaporize the organic solvent mixed in the sealing compound.

The conditions of this drying operation are not especially limited, and any conditions in which the organic solvent can be vaporized are allowed. However, from the viewpoint of the materials flow in the entire battery production line, it is preferable to set the drying temperature and drying time such that in the environment in which the production line operates, the organic solvent is vaporized and the coating film as described above can be formed at the coating area of sealing compound in the process from the application of sealing compound to the setting onto the plate group member.

Next, as shown in FIG. 4, the stepped insulating ring 4 having been dried is set onto the shelf portion 2b and further the cover 5 is set onto the step portion 4c of the stepped insulating ring 4 to form the area to be sealed near the top opening of the bottomed cylindrical can 2. Then crimping operation is performed by the ordinary method.

Figure 7:
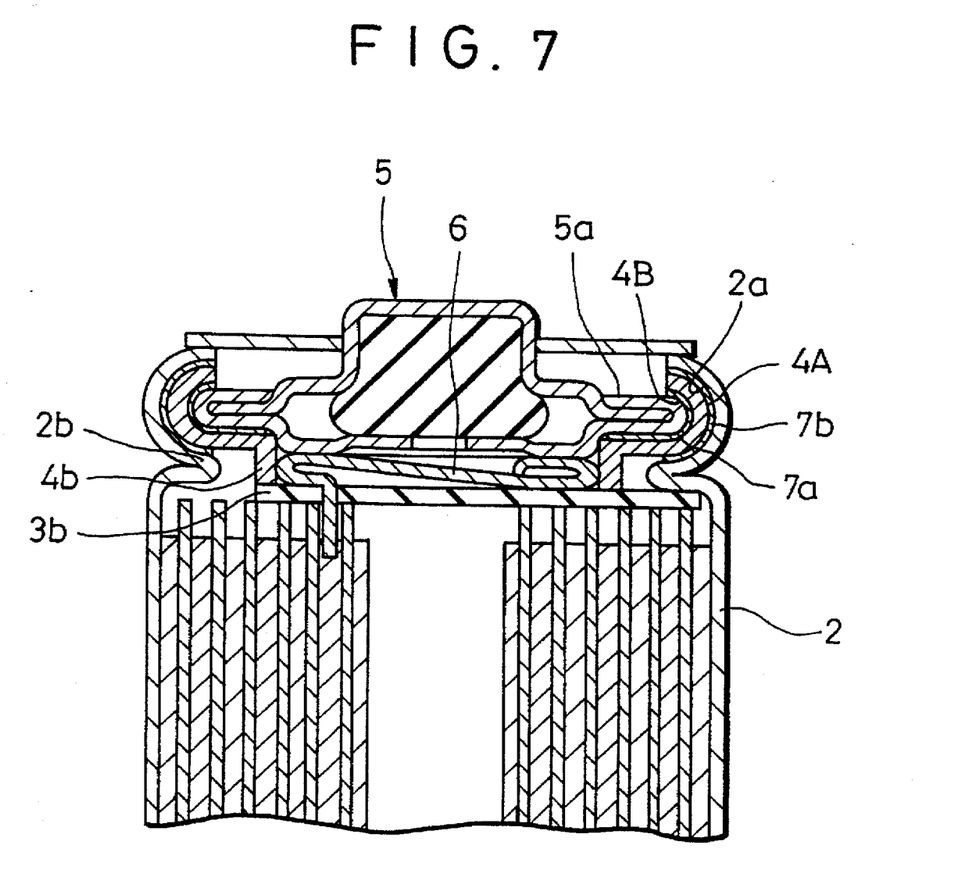
FIG. 7 is an enlarged sectional view showing a state of a crimped seal area in accordance with the present invention.

As a result as shown in FIG. 7, at the crimped seal area, the large-diameter upper portion 4a of the stepped insulating ring 4 shown in FIG. 6 is crimped by the inside wall 2a near the top opening of the bottomed cylindrical can 2 and the peripheral portion 5a of the cover 5. The sealing compound (coating film) 7b formed at the outside portion 4D$_2$ of the corner 4d (or the shelf portion 2b) shown in FIG. 6 is packed between the inside wall 2a and the outside peripheral wall 4A of the deformed large-diameter upper portion 4a by the crimping force, and the sealing compound (coating film) 7a formed at the inside portion 4D$_1$ of the corner 4d shown in FIG. 6 is packed between the peripheral portion 5a of the cover 5 and the inside peripheral wall 4B of the deformed large-diameter upper portion 4a to form the crimped seal area. Thus, the closed construction of battery is completed.

[Working Example]

Working examples 1 to 5, comparative example 1

A Ni electrode sheet and a hydrogen storage alloy electrode sheet, which were manufactured by the ordinary method, were wound with a nylon separator being interposed between them to form a plate group member of 13 mm in outside diameter and 43 mm in height.

The plate group member 1 was inserted in a bottomed cylindrical can 2, which was made of a Ni-plated stainless steel and had an inside diameter of 13.4 mm and a height of 50 mm, as shown in FIG. 1, and a predetermined alkali electrolyte was poured in the can 2.

On the other hand, a stepped insulating ring 4, which was made of nylon and had a shape as shown in FIGS. 3 and 6 was prepared. For this ring, a large-diameter upper portion 4a had an outside diameter of 13.4 mm, an inside diameter of 11.9 mm, and a height of 2.85 mm, while a small-diameter foot portion 4b has an outside diameter of 10.6 mm, an inside diameter of 9.0 mm, and a height of 1.15 mm, the total height being 4 4.0 mm.

Also, a viscous sealing compound was prepared by mixing 30 parts by weight of toluene (manufactured by Komune Kagaku Yakuhin) and 2.5 parts by weight of FBK#150 (trade name, paraffin base oil manufactured by Nippon Sekiyu) with 100 parts by weight of Asphalt Primer R (trade name, asphalt manufactured by Sankyo Yuka Kougyo).

This sealing compound was applied to an inside portion 4D$_1$ of a corner 4d of the aforementioned stepped insulating ring 4 and a shelf portion 2b of the bottomed cylindrical can 2 over the whole circumference over a width of 1.5 mm.

After the sealing compound was applied, hot air with a temperature of 40° C. was blown to the coating areas for about 4 minutes to form coating films of sealing compound 7a and 7b, and then the stepped insulating ring 4 was set onto the shelf portion 2b as shown in FIG. 4.

The weight of the formed coating film was measured, and the thickness of the formed coating film was calculated by dividing the measured weight by the coating area. By changing the coating amount of the sealing compound, the thickness of the formed coating film was changed as given in Table 1.

Then, after the cover 5 was set onto the stepped insulating ring 4, the whole was crimped to form a crimped seal area of a closed construction as shown in FIG. 7. Thus, a cylindrical nickel-hydrogen rechargeable battery was assembled.

For comparison, a battery of comparative example was assembled by setting the stepped insulating ring, which was the same as that of the working example, without the application of sealing compound and by performing crimping operation in the same way.

On each of 20 batteries obtained, a temperature/humidity cycle test was conducted as described later, and then phenolphthalein was applied to the crimped seal areas to investigate the presence of leakage of electrolyte from the crimped seal areas by checking whether or not phenolphthalein changed into red.

The temperature/humidity cycle test was conducted as described below.

First, the battery was heated from an environmental condition of a temperature of 25° C. and relative humidity of 80% to a condition of a temperature of 65° C. and relative humidity of 80% in 2.5 hours. After the battery was kept under this condition for 3 hours, the battery was cooled to a condition of a temperature of 25° C. and relative humidity of 80% in 2.5 hours. After that, the battery was heated immediately to a condition of a temperature of 65° C. and relative humidity of 80% again in 2.5 hours, and kept under this condition for 3 hours. Then, the battery was cooled to a condition of a temperature of 25° C. and a relative humidity of 75% in 2.5 hours, and kept under this condition for 1.5 hours. Immediately, the battery was rapidly cooled to an environment of a temperature of minus 10° C. and relative humidity of 0%, and kept in this environment for 3.5 hours. After that, the battery was heated again to a condition of a temperature of 25° C. and a relative humidity of 0%, and kept under this condition for 3 hours. This cycle (one cycle took 24 hours) was repeated 20 times.

Table 1 gives the result for each thickness of the formed coating film of sealing compound.

TABLE 1

|  | Thickness of formed coating film (g/cm$^2$) | Number of batteries whose electrolyte leaks | Leakage occurrence percentage (%) |
|---|---|---|---|
| Example 1 | 0.0003 | 17 | 25 |
| Example 2 | 0.0005 | 8 | 40 |
| Example 3 | 0.001 | 0 | 0 |
| Example 4 | 0.005 | 0 | 0 |
| Example 5 | 0.010 | 0 | 0 |
| Comparative Example 1 | Unapplied | 20 | 100 |

As seen from Table 1, for the battery manufactured by the method of working example, the leakage of electrolyte is remarkably restrained as compared with the battery of comparative example. This effect is given by the process in which the sealing compound is applied to the nylon ring and crimping operation is performed after the coating film is formed.

As the thickness of the coating film increases, the leakage phenomenon occurs less frequently. However, in the case where the thickness of coating film is 0.010 g/cm$^2$, after crimping, black sealing compound was pushed out thinly onto the surface of the crimped seal area on 10 batteries.

Thereupon, the thickness of coating film of 0.001 to 0.005 g/cm$^2$ is suitable for restraining both of electrolyte leakage and poor appearance.

Working examples 6 to 8

Various kinds of sealing compounds, which had the same ingredients as those of working example 1 but different composition, were prepared by mixing oily bitumen, toluene, and paraffin base oil, which were the same as those for the sealing compound of working example 1, at a ratio (part by weight) given in Table 2. These sealing compounds were applied to the corner of the nylon ring and the shelf portion of the bottomed cylindrical can, which were the same as those of working example 1 so that the thickness of coating film after being dried was 0.001 g/cm$^2$, and cylindrical nickel-hydrogen secondary batteries were assembled in the same way as that of working example 1. The condition of sealing compound application and the condition of formed coating film are given in Table 2.

A temperature/humidity cycle test, which was the same as that of working example 1, was conducted on these batteries, and the leakage of electrolyte was investigated. The results are given in Table 2.

TABLE 2

| | Sealing Compound | | | | | Number of batteries whose electrolyte leaks |
|---|---|---|---|---|---|---|
| | Asphalt (part by weight) | Toluene (part by weight) | Paraffin base oil (part by weight) | Condition of sealing compound | Condition of coating film | |
| Example 6 | 100 | 300 | 5 | Low viscosity | Slightly soft | 10 |
| Example 7 | 100 | 10 | 5 | High viscosity | Slightly hard | 5 |
| Example 8 | 100 | 100 | 50 | Slightly low viscosity | Very soft | 15 |

As seen from Table 2, as the mixed amount of toluene increases, the viscosity of sealing compound decreases. Consequently, it is difficult to apply the sealing compound, and a crater and the like are produced in the formed coating film, so that the decrease in sealing effect is found. Also, as the mixed amount of toluene decreases, it becomes difficult to apply the sealing compound, so that also the sealing effect decreases.

If the amount of paraffin base oil is too large, the formed coating film is very soft and is pushed out during the crimping operation, so that the sealing effect decreases.

Working example 9, comparative examples 2 and 3

The nylon ring used in working example 1 was dipped in uncured epoxyresin (ARALDITECY221, trade name) and taken out to coat the whole surface of the nylon ring with the aforesaid uncured epoxy resin. The coating amount was 0.001 g/cm$^2$.

Then, the sealing compound used in working example 1 was applied to this nylon ring in the same way as working example 1 so that the thickness of the formed coating film is 0.001 g/cm$^2$. Also, the same sealing compound was applied to the shelf portion of the bottomed cylindrical can so that the thickness is 0.001 g/cm$^2$. After drying, a battery was assembled in the same way as working example 1.

For comparison, a battery was assembled by setting a nylon ring coated with uncured epoxy resin without the application of sealing compound (comparative example 2). Also, a battery was assembled using an uncoated nylon ring (comparative example 3).

The same temperature/humidity cycle test as that in working example 1 was conducted on 50 batteries of these three kinds to investigate the leakage of electrolyte.

Figure 8:
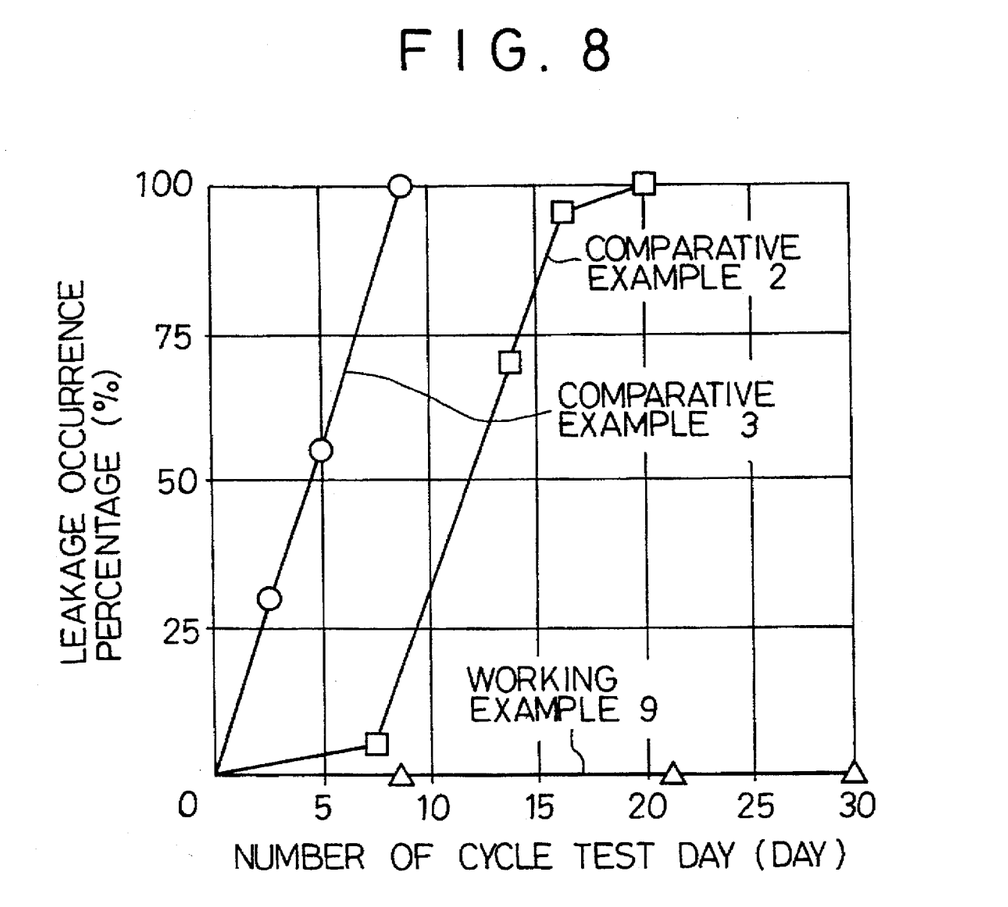
FIG. 8 is a graph showing a relationship between the leakage occurrence percentage and the number of temperature/humidity cycle test days.

The result is shown in FIG. 8 by the relationship between the number of cycle test days and the leakage occurrence percentage (%).

As is evident from FIG. 8, for the battery of comparative example 3, leakage occurs on all batteries in about 9 days after the start of the temperature/humidity cycle test. For comparative example 2, though the liquid leakage resistance is improved, leakage occurs on all batteries when 20 days elapse. Contrarily, for the battery of working example 9, leakage does not occur even after 30 days elapse. The battery of working example 9 has a very high liquid leakage resistance in a high-temperature, high-humidity environment.

Working example 10

Various kinds of sealing compounds as shown in Table 3 were prepared by changing the kind of oily bitumen. By using these sealing compounds, 20 batteries were assembled under the same condition as that of working example 1 so that the thickness of the formed coating film was 0.001 g/cm$^2$.

On these batteries, the same temperature/humidity cycle test as that of working example 1 was conducted, and the number of batteries on which the leakage of electrolyte occurred was measured. The results are given collectively in Table 3.

TABLE 3

| Composition of sealing compound | | | | | | Number of batteries whose electrolyte leaks |
|---|---|---|---|---|---|---|
| Oily Bitumen | | Organic solvent | | paraffin base oil | | |
| Kind | Ratio (Part by weight) | Kind | Ratio (Part by weight) | Kind | Ratio (Parts by weight) | |
| SK Super Asphalt 7-8 | 100 | Toluene | 30 | TBKR046 | 3 | 0 |
| SK Super Asphalt 3-E | 100 | Toluene | 30 | TBKR0220 | 3 | 0 |
| SK Super Asphalt 10-20 | 100 | Toluene | 30 | Liquid paraffin | 3 | 0 |

What is claimed is:

1. A method for manufacturing a cylindrical nickel-hydrogen rechargeable battery, comprising the steps of:

inserting a stepped insulating ring having a large-diameter upper portion, a small-diameter foot portion, and a step portion formed on the inside from a top opening of a bottomed cylindrical can containing a plate group member and electrolyte and setting said small-diameter foot portion onto said plate group member;

setting a peripheral portion of a cover in which a safety valve is incorporated onto said step portion of said stepped insulating ring, and forming areas to be sealed where an inside wall of said top opening of said bottomed cylindrical can faces an outside wall of said large-diameter upper portion of said stepped insulating ring and an inside wall of said large-diameter upper portion faces a peripheral portion of said cover;

performing a crimping operation on said areas to be sealed from the outside of the upper part of said bottomed cylindrical can to form a closed construction;

applying a sealing compound consisting essentially of an oily bitumen, an organic solvent, and a paraffin base oil to said areas where an inside wall of said top opening of said bottomed cylindrical can faces an outside wall of said large-diameter upper portion of said stepped insulating ring and an inside wall of said large-diameter upper portion faces a peripheral portion of said cover before said areas to be sealed are formed, said sealing compound being prepared by mixing 10 to 200 parts by weight of said organic solvent and 1 to 10 parts by weight of said paraffin base oil with 100 by weight of said oily bitumen, and drying said sealing compound.

2. The method for manufacturing a cylindrical nickel-hydrogen rechargeable battery according to claim 1, wherein said sealing compound is applied to the inside and outside portions of a corner positioned at the boundary of the large-diameter upper portion and the small-diameter foot portion of said stepped insulating ring.

3. The method for manufacturing a cylindrical nickel-hydrogen rechargeable battery according to claim 1, wherein said sealing compound is applied so that the weight of coating film of said sealing compound is 0.001 g or larger per coating area ($cm^2$) after said drying.

4. The method for manufacturing a cylindrical rechargeable battery according to claim 1, wherein uncured epoxy resin is applied before the application of said sealing compound.

* * * * *